US011221664B2

(12) United States Patent
Benson et al.

(10) Patent No.: US 11,221,664 B2
(45) Date of Patent: Jan. 11, 2022

(54) POWER STATE INDICATIONS

(71) Applicant: HEWLETT-PACKARD DEVELOPMENT COMPANY, L.P., Spring, TX (US)

(72) Inventors: Roger D Benson, Houston, TX (US); Wen-Shih Chen, Taipei (TW); Charles Shaver, Houston, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/481,852

(22) PCT Filed: Sep. 22, 2017

(86) PCT No.: PCT/US2017/052905
§ 371 (c)(1),
(2) Date: Jul. 30, 2019

(87) PCT Pub. No.: WO2019/059922
PCT Pub. Date: Mar. 28, 2019

(65) Prior Publication Data
US 2020/0225730 A1    Jul. 16, 2020

(51) Int. Cl.
*G06F 1/3234* (2019.01)
*G06F 1/26* (2006.01)
(Continued)

(52) U.S. Cl.
CPC .......... *G06F 1/3265* (2013.01); *G06F 1/1601* (2013.01); *G06F 1/266* (2013.01);
(Continued)

(58) Field of Classification Search
CPC .... G06F 1/3218; G06F 1/3265; G06F 1/1601; G06F 1/266; G06F 1/3296; G05B 15/02; Y02D 10/00
(Continued)

(56) References Cited

U.S. PATENT DOCUMENTS 6,289,466 B1   9/2001  Bayramoglu et al.
8,380,999 B1 * 2/2013  Robison ............ H04W 52/0264
                                                  713/300
(Continued)

OTHER PUBLICATIONS

Yue, W. et al., a Task-specific Approach to Dynamic Device Power Management for Embedded System, Dec. 2005, http://ieeexplore.ieee.org/abstract/document/1609872/.

*Primary Examiner* — Chun Cao
(74) *Attorney, Agent, or Firm* — Conley Rose PC (57) ABSTRACT

An example display includes a user interface. The user interface is to receive an indication to change a power state. The display includes a communication engine to determine a power state of the computing device communicatively coupled to the communication engine. The display includes a power engine to, based on the power state of the computing device, determine whether to communicate the indication to change the power state to the computing device. The power engine is to, based on the indication to change the power state, alter a power state of the display. The communication engine is to communicate the indication to change the power state to the computing device based on a determination to do so.

14 Claims, 6 Drawing Sheets

(51) Int. Cl.
  *G06F 1/16* (2006.01)
  *G06F 1/3218* (2019.01)
  *G06F 1/3296* (2019.01)
  *G05B 15/02* (2006.01)

(52) U.S. Cl.
  CPC .......... *G06F 1/3218* (2013.01); *G06F 1/3296* (2013.01); *G05B 15/02* (2013.01)

(58) Field of Classification Search
  USPC ....................................................... 713/320
  See application file for complete search history.

(56) References Cited

U.S. PATENT DOCUMENTS

| | | |
|---|---|---|
| 8,448,112 B1 | 5/2013 | Kashai et al. |
| 9,376,289 B2 | 6/2016 | Herkel et al. |
| 9,436,268 B2 | 9/2016 | de Santiago Dominguez et al. |
| 9,625,988 B1 | 4/2017 | Agarwal et al. |
| 9,684,355 B2 | 6/2017 | Yung |
| 2002/0065110 A1* | 5/2002 | Enns .................. H04M 1/7253 455/566 |
| 2007/0124608 A1* | 5/2007 | Knowlson ............. G06F 1/3215 713/300 |
| 2008/0159413 A1* | 7/2008 | Mehan .................... G06F 1/266 375/257 |
| 2008/0222433 A1* | 9/2008 | Kim ...................... G06F 1/3265 713/300 |
| 2009/0234512 A1 | 9/2009 | Ewing et al. |
| 2012/0080949 A1 | 4/2012 | Gelonese |
| 2014/0267316 A1* | 9/2014 | Connell ................ G06F 9/5044 345/503 |
| 2017/0201995 A1 | 7/2017 | Rong et al. |

\* cited by examiner

POWER STATE INDICATIONS

BACKGROUND

A computer system may include a processor and a computer-readable medium. The computer-readable medium may include instructions to be executed by the processor. The processor may execute the instructions to perform operations based on data stored on the computer-readable medium or inputs received from a user or a network. For example, the computer system may include or be communicatively coupled to a mouse, touchpad, touch screen, keyboard, etc. to provide inputs to the computer system. The computer system may be communicatively coupled to the network wirelessly or by a wire. The computer system may output information to the user or the network, for example, based on the results of the operations. For example, the computer system may include or may be communicatively coupled to a display, a speaker or headphones, a printer, or the like, which may output the information.

DETAILED DESCRIPTION

In some examples, a computing device may be communicatively coupled to a display. The display may include a virtual reality or augmented reality headset, a projector with or without a screen, a desktop display, a mobile display, or the like. The computing device may provide power to the display, or the display may provide power to the computing device. For example, the computing device or display may provide power wirelessly or through a wired connection. The wireless or wired connection may also communicate data between the computing device and the display. In an example, the computing device and display may be communicatively coupled without one providing power to the other.

The computing device may include, e.g., a laptop, a desktop, a thin client, a backpack computer, a mobile device, or the like. A power button of the computing device may inconvenient or difficult for a user to access. For example, a clamshell laptop may be in a closed configuration while connected to a display, and a power button may be inaccessible while the clamshell is in the closed configuration. In an example, the computing device may be behind the display or attached to the back of the display, and access to the power button may be impeded by the display. In an example, the computing device may be situated under a desk or in a cabinet or drawer, and the power button may difficult to access due to the location of the computing device. In an example, a backpack computer may be on the user's back, and the power button may be difficult to access while the backpack is on the user's back. The display may control the power state of the computing device so that the user may modify the power state of the computing device without accessing the power button.

The display and the computing device may have different power states. For example, the display may be on, and the computing device may be off or vice versa. The display and computing device may be unusable in such states because the user is unable to view the processing occurring or no processing is occurring for the user to view. The user may indicate to the display and the computing device to change their power states, but the display and the computing device may move from one unusable state to another unusable state if both change their power states. Accordingly, the display and the computing device may be more convenient to use if such unusable states were avoided when changing the power state of the display or the computing device.

The computing device may perform a shutdown sequence, a hibernate or sleep sequence, a logout sequence, or the like when changing power state. In some situations, the computing device may indicate to the user to take an action. For example, the computing device may ask the user to close an application, to save or discard unsaved data, etc. The display may change power state more quickly than the computing device. Accordingly, the display may enter a low power state before the computing device has finished entering a low power state. If the display is already in the low power state and the computing device indicates to the user to take an action, the user may be unaware of the indication from the computing device. As a result, the computing device may not finish changing the power state. The display and the computing device may be more convenient to use and may conserve power by ensuring the display communicates any indications from the computing device prior to the computing device finishing its change in power state.

Figure 1:
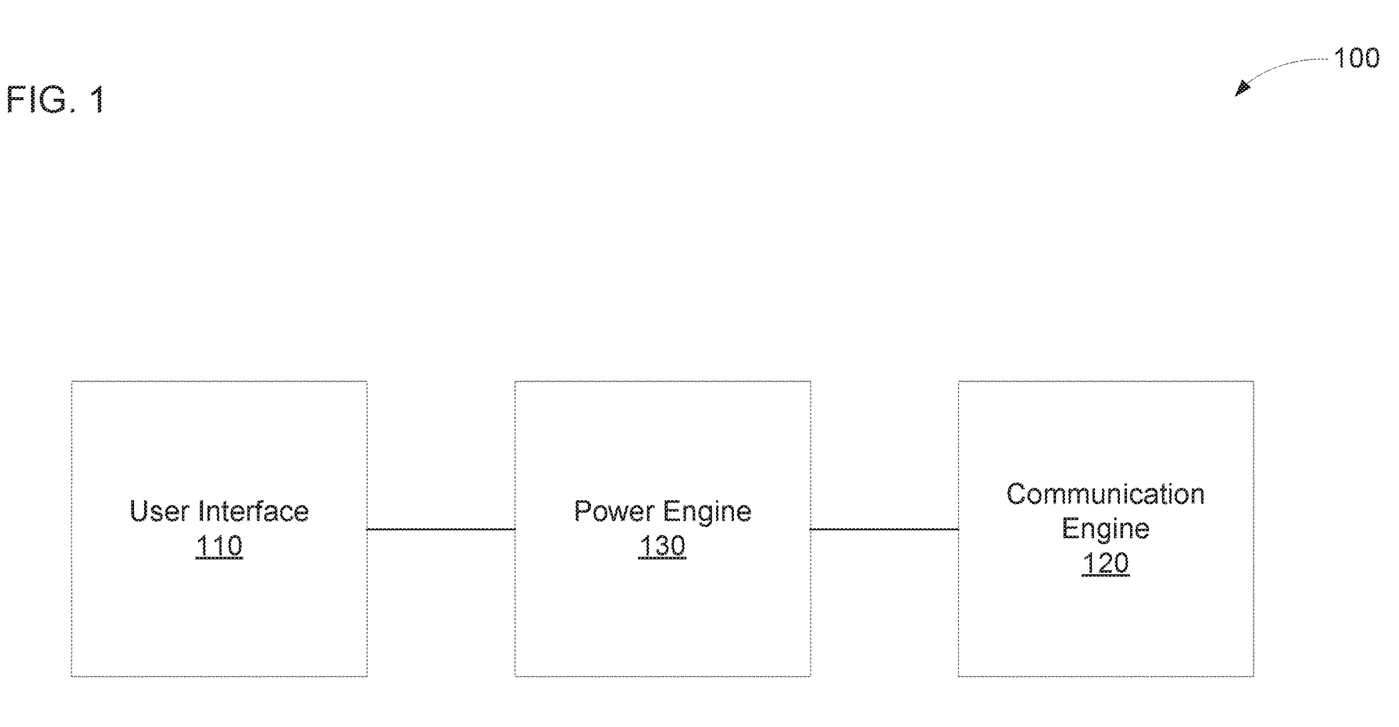
FIG. 1 is a block diagram of an example display to change a power state of a computing device.

FIG. 1 is a block diagram of an example display 100 to change a power state of a computing device. The display 100 may include a user interface 110 to receive an indication to change a power state. For example, the user may interact with the user interface to indicate that the power state should be changed. The user interface 110 may include mechanical elements to receive the indication that the power state should be changed. The user interface 110 may also or instead include an engine to receive the indication that the power state should be changed. As used herein, the term "engine" refers to hardware (e.g., a processor, such as an integrated circuit or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or executed or interpreted by a processor), or hardware and software hosted at hardware.

The display 100 may include a communication engine 120. The communication engine 120 may be communicatively coupled to a computing device (not shown). The communication engine 120 may determine a power state of a computing device. For example, the communication engine 120 may determine the power state based on communications from the computing device, the lack of communications from the computing device, or the like. The communication engine 120 may communicate indications to change the power state to the computing device. For example, the communication engine 120 may transmit the indication to change the power state, and the computing device may change the computing device's power state based on receiving the indication to change the power state. The computing device may transition itself from a low power state to a high power state or from a high power state to a low power state. The low power state of the computing device may be an off state, a hibernate state, a sleep state, a standby state, or the like (e.g., an S5, S4, S3, S2, S1, S0 low-power idle state, or the like). The high power state may be an on or fully usable state (e.g., an S0 state or the like) or may be a power state that is higher than the low power state (e.g., an S4, S3, S2, S1, S0 low-power idle state, or the like).

The display 100 may include a power engine 130. The power engine 130 may be communicatively coupled to the user interface 110 or the communication engine 120. The power engine 130 may determine whether to communicate the indication to change the power state to the computing device. For example, the power engine 130 may determine whether to communicate the indication based on the power state of the computing device. The power engine 130 may instruct the communication engine 120 to communicate the indication to change the power state based on a determination to do so. The power engine 130 may alter a power state of the display 100 based on the indication to change the power state. For example, the power engine 130 may transition the display 100 from a low power state to a high power state or from a high power state to a low power state. The low power state of the display 100 may be an off state or a power state in which the display 100 uses less power than the high power state (e.g., some components of the display have been turned off, placed in a low power state, made temporarily inoperable, or the like). The high power state may be an on or fully usable state or may be a power state in which the display 100 consumes more power than in the low power state (e.g., some components have been turned on, placed in a high power state, made operable, or the like).

Figure 2:
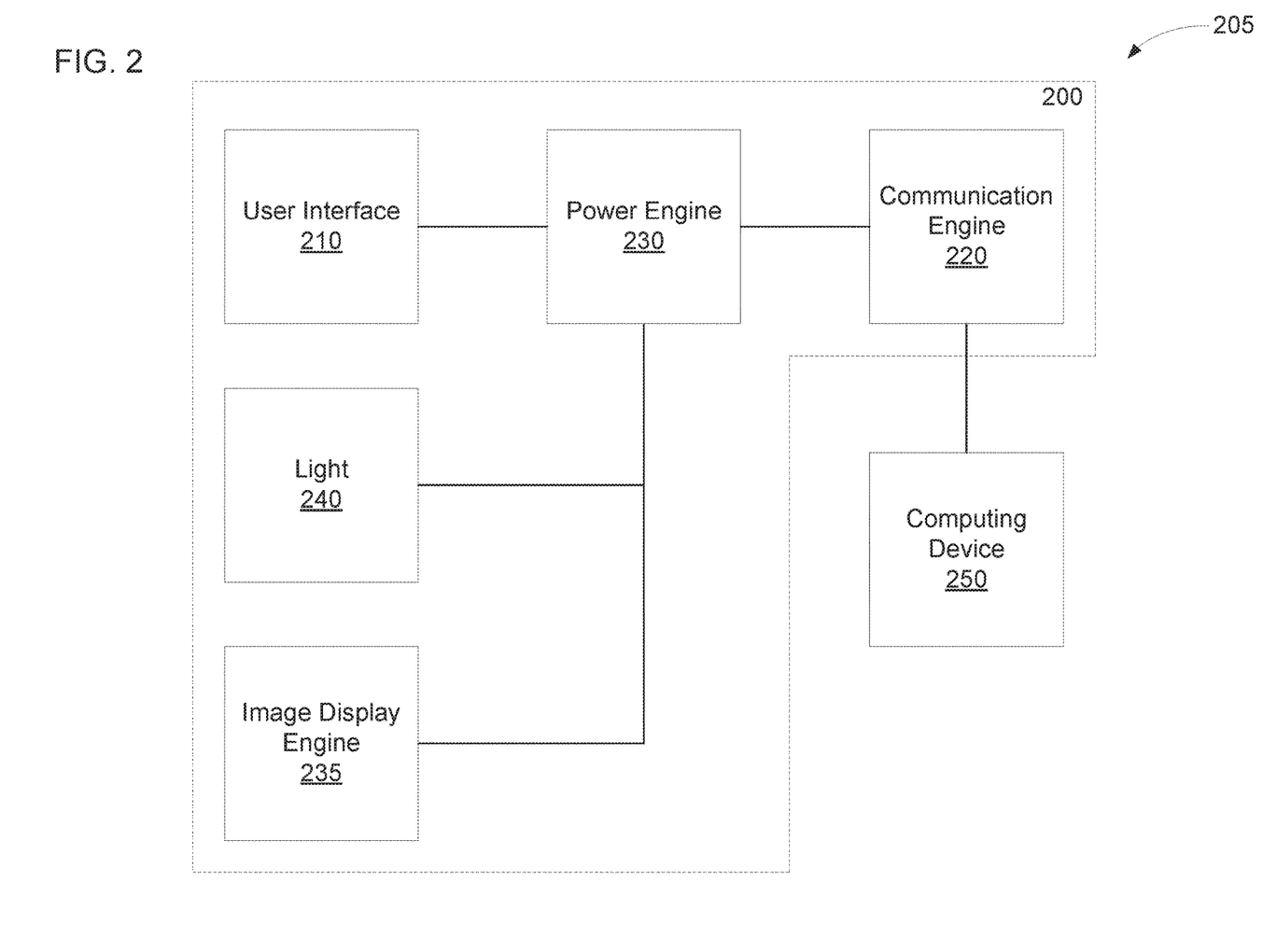
FIG. 2 is a block diagram of another example display to change a power state of a computing device.

FIG. 2 is a block diagram of another example display 200 to change a power state of a computing device 250. A computer system 205 may include the display 200 and the computing device 250. The computing device 250 may be physically distinct or separate from the display 200 and may be contained in a different housing. For example, there may be no couplings (e.g., mechanical, electrical, communicative, etc.) between the display 200 and the computing device 250 other than a data or power coupling. The display 200 may include a user interface 210 to receive an indication to change a power state. For example, the user interface 210 may include a power button (e.g., a mechanical button, a soft button, etc.), a power switch, a knob, a graphical user interface, or the like to receive the indication to change the power state. The user interface 210 may convert a mechanical interaction with the user interface 210 by the user into an electrical signal indicative of the user's interaction.

The display 200 may include a communication engine 220, which may be communicatively coupled to the computing device 250. For example, the communication engine 220 may be communicatively coupled by a wireless or wired connection. In some examples, the wired connection may be a Universal Serial Bus (USB) connection (e.g., a type A connector, a type B connector, a type C connector, etc.), a Thunderbolt connection, a High-Definition Multimedia Interface (HDMI) connection, an Ethernet connection, a custom connection, or the like. The communication engine 220 may determine a power state of the computing device 250. For example, the communication engine 220 may receive or retrieve the power state of the computing device 250 from the computing device 250. The computing device 250 may include a controller able to determine and transmit the power state of the computing device 250 even when the computing device 250 is in a low power state. For example, the controller may monitor power rails of the computing device 250 to determine the power state, may receive an indication of the power state from, e.g., a basic input/output system (BIOS), or the like.

The communication engine 220 and the computing device 250 may perform a negotiation in which the communication engine 220 determines whether the computing device 250 is capable of changing the power state based on indications from the communication engine 220 to do so. Similarly, the computing device 250 may determine whether the communication engine 220 is capable of transmitting indications to change the power state. The communication engine 220 and the computing device 250 may initially negotiate a communication mode that supports communicating indications to change power states. For example, the communication engine 220 or the computing device 250 may publish communication modes and may enter the communication mode based on detecting that the communication engine 220 and the computing device 250 support a common communication mode. Once in the communication mode, the communication engine 220 or the computing device 250 may receive a message indicating that the computing device 250 or the communication engine 220 is capable of receiving or transmitting indications to change the power state or is capable changing the power state accordingly. For example, the communication engine 220 or the computing device 250 may publish supported commands or features.

In an example, the communication engine 220 may be communicatively coupled to the computing device 250 via a coupling to transfer power and data. For example, the communication engine 220 may be coupled to the computing device 250 via a USB power delivery (PD) connection that can exchange power or data between the communication engine 220 and the computing device 250. The communication engine 220 and the computing device 250 may negotiate a USB PD alternate mode. In the alternate mode, the communication engine 220 or the computing device 250 may indicate capabilities, such as the capability of the computing device 250 to receive and act on messages indicating that the computing device 250 should change the power state or the capability of the communication engine 220 to transmit such messages.

The communication engine 220 may determine a power state of the computing device 250. In some examples, the communication engine 220 may determine the power state of the computing device 250 immediately after or during the negotiation of the communication mode or capabilities by the communication engine 220 and the computing device 250. For example, the computing device 250 may indicate its power state to the communication engine 220 as part of the negotiation or once the negotiation is complete. In response to changes in the power state of the computing device 250, the communication engine 220 may determine that the power state has changed. For example, the computing device 250 may indicate changes in the power state to the communication engine 220 in response to the changes in the power state, or the communication engine 220 may detect that the computing device 250 has stopped responding to messages or has begun responding to messages. Accordingly, the communication engine 220 may determine the power state of the computing device 250 prior to the user interface receiving an indication from the user to change the power state. In some examples, the communication engine 220 may determine the power state of the computing device 250 in response to the user interface receiving an indication from the user to change the power state. For example, the communication engine 220 may transmit a request to the computing device 250 for an indication of the power state of the computing device 250 in response to the user interface receiving the indication from the user to change the power state, and the computing device 250 may indicate the power state to the communication engine 220 in response to the request.

The display 200 may include a power engine 230. The power engine 230 may be communicatively coupled to the user interface 210 and the communication engine 220. The user interface 210 may communicate to the power engine 230 indications to change the power state received by the user interface 210. For example, the power engine 230 may directly or indirectly receive an electrical signal indicative of the user's interaction with the user interface 210. The power engine 230 may determine whether to communicate the indication to change the power state to the computing device 250. The power engine 230 may make the determination in response to the user interface 210 receiving the indication to change the power state.

The power engine 230 may determine whether to communicate the indication to change the power state based on the power state of the computing device 250. For example, the power engine 230 may determine whether the power state of the computing device 250 matches the power state of the display 200. The power engine 230 may determine whether to communicate the indication to the computing device 250 based on whether the power state of the computing device 250 matches the power state of the display 200. The power engine 230 may determine not to communicate the indication to change the power state based on the power engine 230 determining there is a difference between the power state of the display 200 and the power state of the computing device 250.

The power engine 230 may alter a power state of the display 200 based on the indication to change the power state. The power engine 230 may alter the power state of the display 200 regardless of the power state of the computing device 250. The power engine 230 may avoid propagating an inconsistency in power states by altering the power state of the display 200 and selectively instructing the computing device 250 to alter its power state based on whether the power states of the display 200 and the computing device 250 are currently inconsistent. In an example, the power engine 230 may selectively alter the power state of the display 200 based on whether the power states are inconsistent and may instruct the computing device 250 to alter its power state regardless of whether the power states are inconsistent.

Based on an inconsistency, the power engine 230 may select which of the display 200 and the computing device 250 should alter its power state based on the particular power states of the display 200 and the computing device 250. For example, the power engine 230 may select which power state to alter so that both power states are high power states, or the power engine 230 may select which power state to alter so that both power states are low power states. If the display 200 is in a high power state and the computing device 250 is in a low power state, the power engine 230 may determine the computing device 250 should be transitioned to a high power state. If the display 200 is in a low power state and the computing device 250 is in a high power state, the power engine 230 may alter the power state of the display 200 to a high power state.

Based on the power engine 230 determining to communicate the indication to change the power state, the communication engine 220 may communicate the indication to change the power state. For example, the communication engine 220 may transmit a message to the computing device 250 indicating the computing device should change its power state. The computing device 250 may operate as if a user interface directly on the computing device 250 received a user input to change the power state of the computing device 250. The computing device 250 may boot or resume operation if previously in a low power state, or the computing device 250 may enter a low power state if previously in a high power state.

In some examples, the power engine 230 may wait until the computing device 250 has finished transitioning between power states before altering the power state of the display 200. For example, the computing device 250 may request user input after receiving the indication to change the power state or while transitioning from the high power state to the low power state. The display 200 may be able to display the request for user input by remaining in the high power state. The communication engine 220 may detect a change in the power state of the computing device 250 based on the communication of the indication to change the power state. For example, the computing device 250 may indicate when it has changed power states; the communication engine 220 may detect that the computing device has begun or stopped responding to messages; or the like. The power engine 230 may alter the power state of the display 200 based on the detection of the change in the power state of the computing device 250. For example, the power engine 230 may wait until after the communication engine 220 detects the change in the power state of the computing device 250 to alter the power state of the display 200.

It may not be immediately apparent to the user that the user indication to change the power state was received if the power engine 230 delays changing the power state of the display 200 and the computing device 250 takes time to transition its power state. In some examples, the power engine 230 may notify a user of receipt of the indication to change the power state. For example, the display 200 may include a light 240 (e.g., an indicator light), and the light 240 may indicate receipt of the indication to change the power state (e.g., by flashing, by illuminating, by darkening, etc.). The power engine 230 may produce an on-screen display that notifies the user of receipt of the indication to change the power state. An image display engine 235 may produce images visible to the user. The image display engine 235 may produce an image containing the on-screen display.

While waiting for the computing device 250 to change power state, the display 200 may continue to provide data from the computing device 250 to the user. For example, the image display engine 235 may display image data from the computing device 250. The light 240 may also, or instead, provide data from the computing device 250 by indicating a status of the computing device 250. For example, the computing device 250 may illuminate, change the color of, flash, or darken its lights based on its power state. In an example, the light 240 may illuminate, flash, or darken in the same way as if it were a light on the computing device 250. Accordingly, the user may be able to know when the computing device 250 has changed power states based on the light 240. The light 240 may continue to indicate the status of the computing device 250 even after the computing device 250 and the display have both entered low power states. In some examples, the display 200 may not include an additional light to indicate the status of the display 200 other than the light 240 to indicate the status (e.g., power state) of the computing device.

Figure 3:
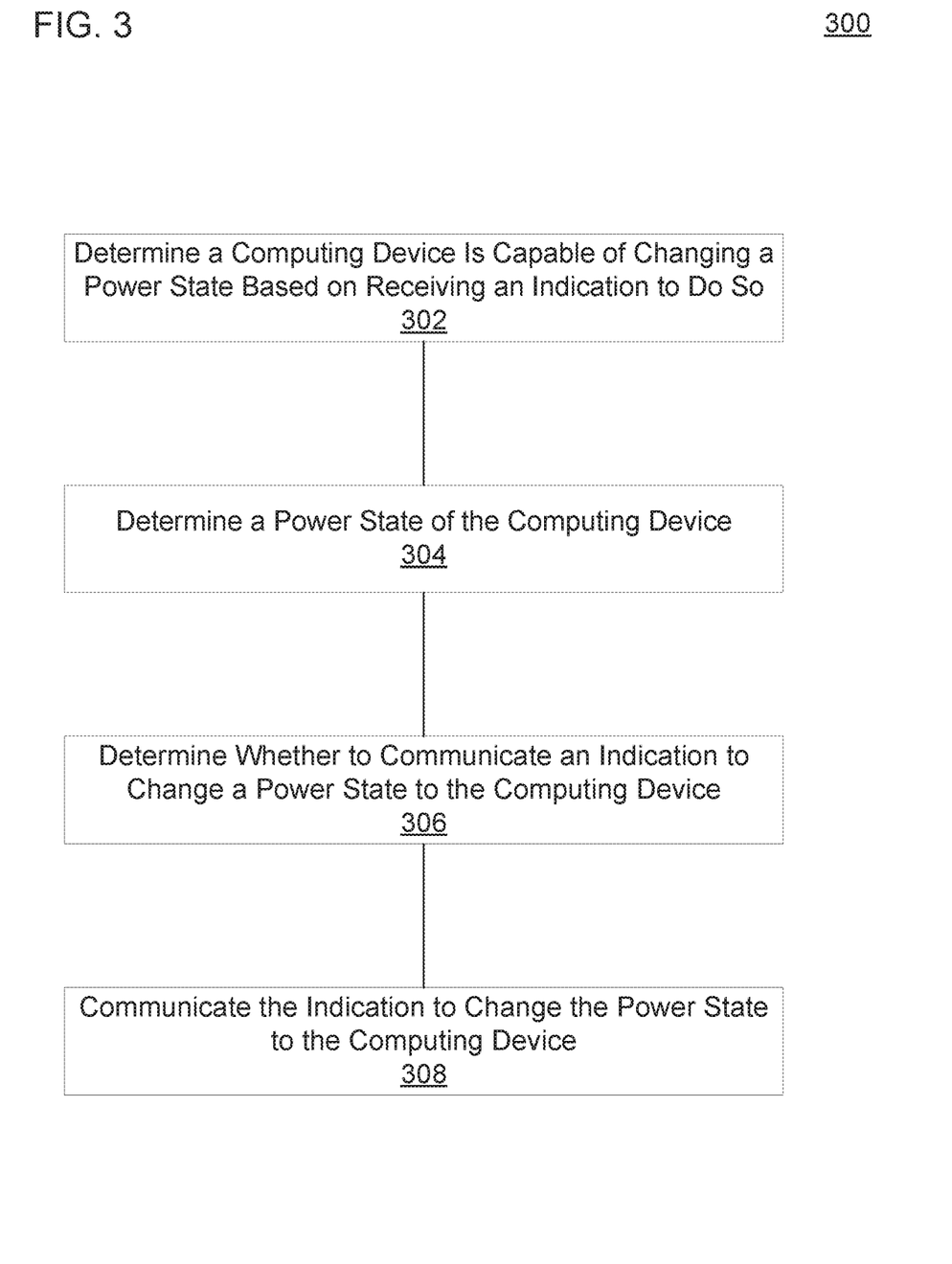
FIG. 3 is a flow diagram of an example method to change a power state of a computing device.

FIG. 3 is a flow diagram of an example method 300 to change a power state of a computing device. A processor may perform the method 300. At block 302, the method 300 may include determining a computing device is capable of changing a power state based on the computing device receiving an indication to do so. For example, the determining may include determining the computing device is capable of changing the power state in response to an indication to change the power state that is received over a communicative coupling from another device.

Block 304 may include determining a power state of the computing device based on the determination that the computing device is capable of changing the power state. For example, after or in response to the determination that the computing device is capable of changing the power state, the power state of the computing device may be determined. In some examples, determining the power state may include determining whether the power state is a high power state or a low power state.

At block 306, the method 300 may include determining whether to communicate an indication to change a power state to the computing device based on the power state of the computing device. For example, the determining may include determining whether to communicate the indication to change the power state based on predetermined criteria related to the power state of the computing device. In some examples, the determining may include determining whether to communicate the indication to change the power state based on a local power state.

Block 308 may include communicating the indication to change the power state to the computing device. For example, based on a determination to communicate the indication to change the power state, the indication to change the power state may be communicated. The indication to change the power state may not be communicated to the computing device based on a determination not to communicate the indication to change the power state. Referring to FIG. 1, in an example, the communication engine 120 may perform blocks 302, 304, or 308; and the power engine 130 may perform block 306.

Figure 4:
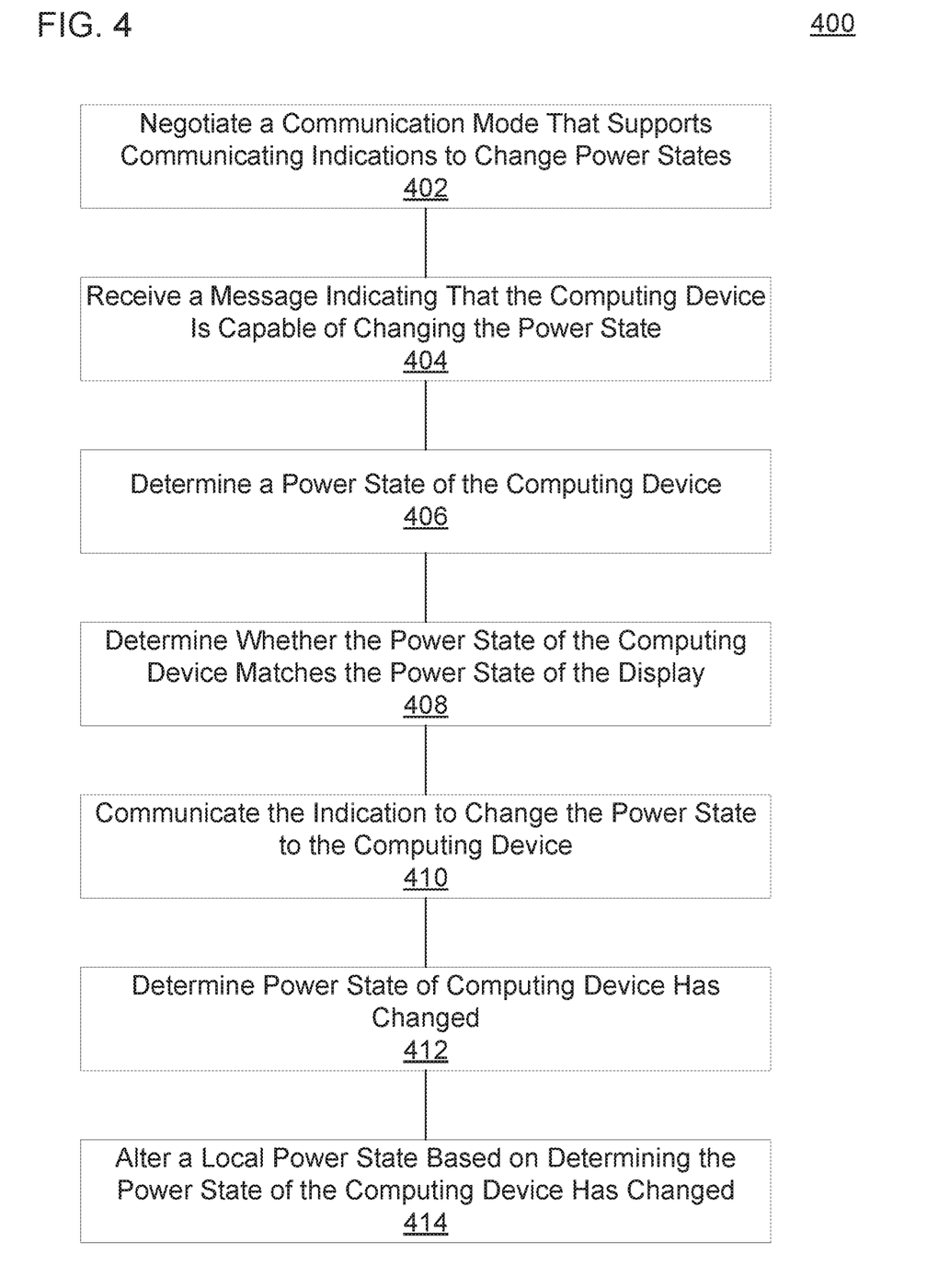
FIG. 4 is a flow diagram of another example method to change a power state of a computing device.

FIG. 4 is a flow diagram of another example method 400 to change a power state of a computing device. A processor may perform the method 400. In some examples, the method 400 may include determining a computing device is capable of changing a power state based on the computing device receiving an indication to change the power state. For example, it may be determined whether the power state can be remotely changed by indicating to the computing device to change the power state. At block 402, the method 400 may include negotiating a communication mode that supports communicating indications to change power states. A list of supported communication modes may be transmitted by the computing device or to the computing device. A commonly supported communication mode may be selected, and the computing device may be communicated to in the selected communication mode. The selected communication mode may support communication of indications to change power states.

At block 404, the method 400 may include receiving a message in the communication mode, the message indicating that the computing device is capable of changing the power state. For example, a list of supported features, commands, messages, or the like may be transmitted by the computing device or to the computing device. The transmission may indicate that the computing device is able to receive and act on messages indicating to change the power state of the computing device. In some examples, the method 400 may include transmitting a message to the computing device indicating support for transmission of messages indicating to change the power state of the computing device.

Block 406 may include determining a power state of the computing device. For example, the power state of the computing device may be determined after or in response to determining the computing device is capable of changing the power state based on the computing device receiving an indication to do so. In some examples, the computing device may indicates its power state without receiving a request to do so. For example, the computing device may indicates its power state after or in response to transmission of a message to the computing device indicating support for transmission of messages indicating to change the power state of the computing device. The computing device may indicate its power state when it detects a change in the power state without receiving a request to do so. Determining the power state of the computing device may include receiving or processing an indication of the power state from the computing device. In some examples, determining the power state may include requesting an indication of the power state, detecting the power state based on a responsiveness or unresponsiveness of the computing device, or the like.

The method 400 may include determining whether to communicate an indication to change the power state to the computing device based on the power state of the computing device. For example, at block 408, the method 400 may include determining whether the power state of the computing device matches a local power state. In an example, it may be determined to communicate the indication to change the power state if the power states match, and it may be determined not to communicate the indication if the power states do not match. In some examples, it may be determined to communicate the indication to change the power state if the computing device is in a low power state or if the computing device is in a high power state and a local power state is a high power state. Otherwise, it may be determined not to communicate the indication to change the power state. In an example, it may be determined to communicate the indication to change the power state if the computing device is in a high power state or if the computing device is in a low power state and a local power state is a low power state. Otherwise, it may be determined not to communicate the indication to change the power state.

At block 410, the method 400 may include communicating the indication to change the power state to the computing device. For example, a message may be transmitted to the computing device, and the message may indicate to the computing device to change its power state. The computing device may include a controller to receive the message. The controller may determine that the message indicates to change the power state of the computing device. The controller may indicate to a BIOS that the message was received, and the BIOS or the operating system may transition the computing device between power states.

Block 412 may include determining the power state of the computing device has changed. In an example, the computing device may transmit a message indicating that the power state has changed. Accordingly, determining the power state has changed may include receiving the message indicating that the power state has changed. In some examples, determining the power state has changed may include detecting the change in power state, for example, based on a responsiveness or a non-responsiveness of the computing device. The method 400 may include providing data from the computing device to a user prior to determining the power state has changed.

At block 414, the method 400 may include altering a local power state based on determining the power state of the computing device has changed. For example, the local power state may be transitioned to match the changed state of the computing device. Data from the computing device may be provided until the computing device has changed power state at which point the local power state may be changed. The user may be able to receive the data from the computing device and react to the data while the computing device is transitioning between power states. For example, the computing device may prompt the user while transitioning from the high power state to the low power state, and the prompt may be provided to the user. The local power state may be changed when the computing device will no longer be providing information to the user. In some examples, one of the local power state and the power state of the computing device may be changed without changing the other, for example, to match the power states. The local device may be a display, and altering the local power state may include altering the power state of the display. In an example, the communication engine 220 of FIG. 2 may perform blocks 402, 404, 406, 410, or 412, and the power engine 230 may perform blocks 408 or 414.

Figure 5:
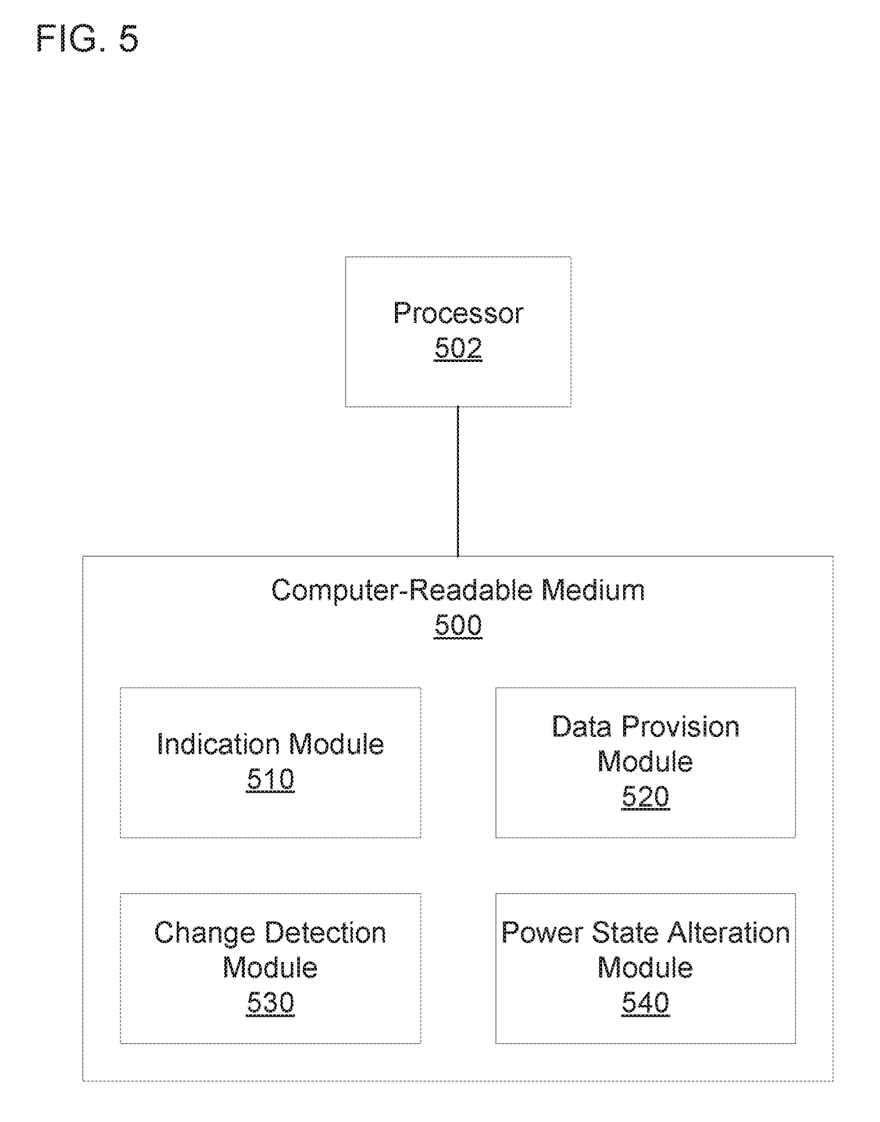
FIG. 5 is a block diagram of an example computer-readable medium including instructions that cause a processor to change a power state of a computing device.

FIG. 5 is a block diagram of an example computer-readable medium 500 including instructions that, when executed by a processor 502, cause the processor 502 to change a power state of a computing device. The computer-readable medium 500 may be a non-transitory computer-readable medium, such as a volatile computer-readable medium (e.g., volatile RAM, a processor cache, a processor register, etc.), a non-volatile computer-readable medium (e.g., a magnetic storage device, an optical storage device, a paper storage device, flash memory, read-only memory, non-volatile RAM, etc.), and/or the like. The processor 502 may be a general purpose processor or special purpose logic, such as a microprocessor, a digital signal processor, a microcontroller, an ASIC, an FPGA, a programmable array logic (PAL), a programmable logic array (PLA), a programmable logic device (PLD), etc.

The computer-readable medium 500 may include an indication module 510. As used herein, a "module" (in some examples referred to as a "software module") is a set of instructions that when executed or interpreted by a processor or stored at a processor-readable medium realizes a component or performs a method. The indication module 510 may include instructions that, when executed, cause the processor 502 to indicate to a computing device to change a power state of the computing device. For example, the indication module 510 may cause the processor 502 to transmit a message to the computing device, and the message may include indication to change the power state of the computing device. The The computer-readable medium 500 may include a data provision module 520. The data provision module 520 may cause the processor 502 to provide data from the computing device to a user after indicating to change the power state of the computing device. For example, the computing device may continue to transmit data while it is changing its power state. The data provision module 520 may cause the processor 502 to provide the transmitted data to the user. The data provision module 520 may cause the processor 502 to receive the data over the same connection used to indicate to the computing device to change the power state or over a different connection.

The computer-readable medium 500 may include a change detection module 530. The change detection module 530 may cause the processor 502 to detect a change in the power state of the computing device. For example, the change detection module 530 may cause the processor 502 to passively receive indications of the power state or changes in the power state or to actively request or discover the power state of the computing device. The computer-readable medium 500 may also include a power state alteration module 540. The power state alteration module 540 may cause the processor 502 to alter a local power state based on the detection of the change in the power state of the computing device. For example, the power state alteration module 540 may cause the processor 502 to alter the local power state in response to or after detecting the change in the power state of the computing device. In an example, when executed by the processor 502, the indication module 510 or the change detection module 530 may realize the communication engine 220 of FIG. 2; the data provision module 520 may realize the light 240 or the image display engine 235; or the power state alternation engine 540 may realize the power engine 230.

Figure 6:
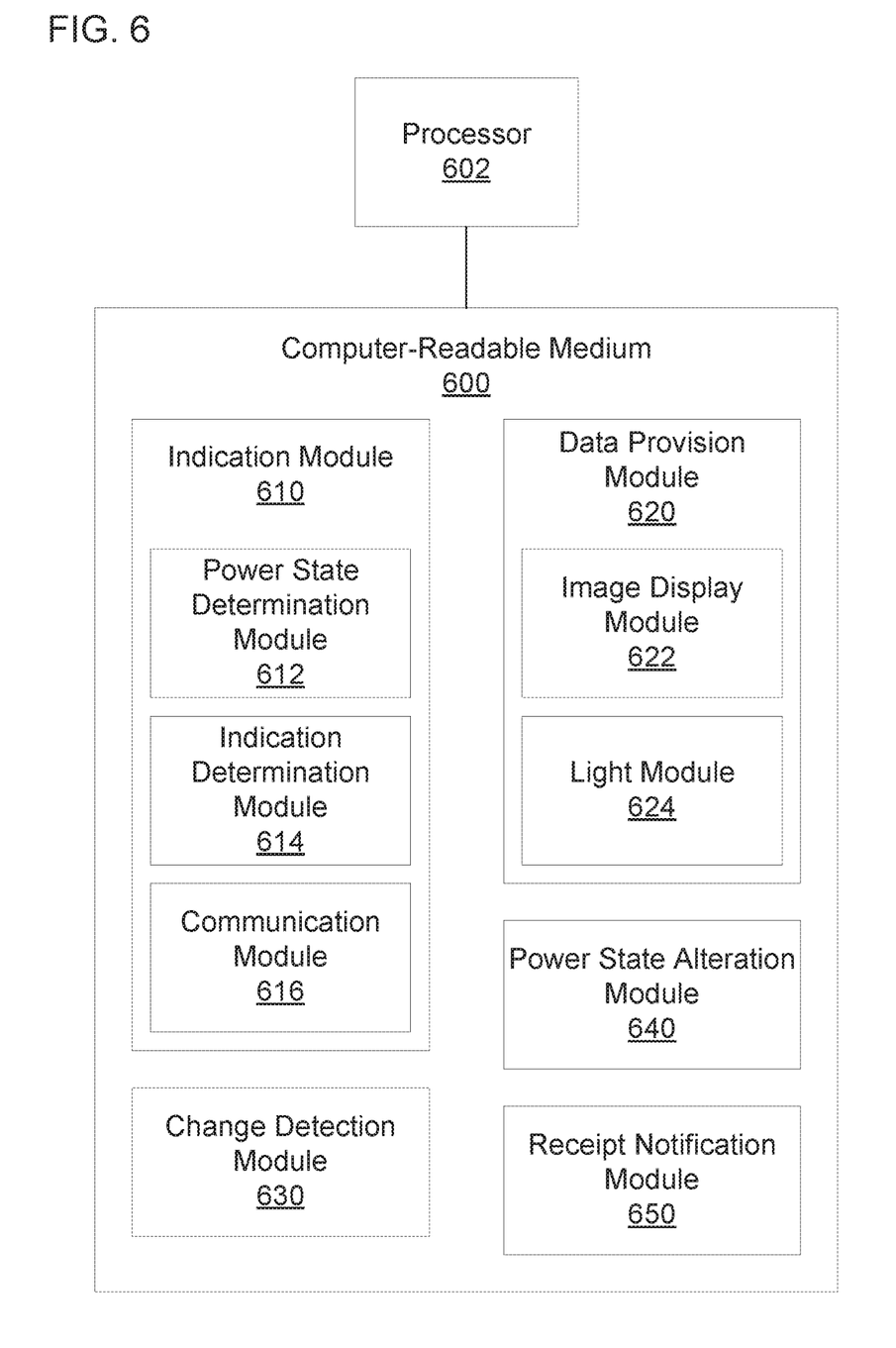
FIG. 6 is a block diagram of another example computer-readable medium including instructions that cause a processor to change a power state of a computing device.

FIG. 6 is a block diagram of another example computer-readable medium 600 including instructions that, when executed by a processor 602, cause the processor 602 to change a power state of a computing device. The computer-readable medium 600 may include an indication module 610. The indication module 610 may cause the processor 602 to indicate to a computing device to change a power state of the computing device. In some examples, the indication module 610 may include a power state determination module 612. The power state determination module 612 may cause the processor 602 to determine a power state of the computing device. For example, the power state determination module 612 may cause the processor 602 to receive indications of the power state of the computing device or to detect the power state of the computing device.

The indication module 610 may include an indication determination module 614. The indication determination module 614 may cause the processor 602 to determine whether to indicate to the computing device to change the power state based on the power state of the computing device and the local power state. For example, the indication determination module 614 may cause the processor 602 to determine whether the power state of the computing device and the local power state match. The indication determination module 614 may cause the processor 602 to determine to transmit the indication if the power state of the computing device and the local power state match and not to do so otherwise. The indication determination module 614 may cause the processor 602 to determine to transmit the indication if doing so would cause the power state of the computing device and the local power state to match and not to do so otherwise.

The indication module 610 may include a communication module 616. The communication module 616 may cause the processor 602 to indicate to the computing device to change the power state of the computing device based on a determination to do so. The communication module 616 may cause the processor 602 to not indicate to the computing device to change its power state based on a determination not to do so. To indicate to the computing device to change the power state, the communication module 616 may cause the processor 602 to transmit a message to the computing device indicating to the computing device to change the power state. The message may specifically indicate that the computing device should transition from a high power state to a low power state or from a low power state to a high power state or identify the power state to which the computing device should change (e.g., an S5, S4, S3, S2, S1, S0 low-power idle state, S0 state, or the like). The message may indicate to change the power state without specifically indicating which direction to change the power state or without identifying the power state into which the computing device should change.

The computer-readable medium 600 may include a data provision module 620. The data provision module 620 may cause the processor 602 to provide data from the computing device to a user after indicating to the computing device to change the power state of the computing device. For example, the computing device may be changing from a high power state to a low power state and may still be generating information of interest to the user while changing between power states. Accordingly, the data provision module 620 may cause the processor 602 to provide the information to the user. In an example, the data provision module 620 may include an image display module 622. The image display module 622 may cause the processor 602 to cause the display of image data. For example, the computing device may generate image data of interest to the user, so the image display module 622 may cause the processor 602 to cause the display of that image data. The data provision module 620 may also, or instead, include a light module 624. The light module 624 may cause the processor 602 to cause the illumination of a light indicative of a status of the computing device. For example, the computing device may generate data for display by a light (e.g., an indicator light or the like), but the light may be obscured. The image display module 622 may cause the processor 602 to cause illumination of the light according to the data. For example, image display module 622 may cause the processor 602 to cause illumination of the light with a brightness, a color, a flashing pattern, or the like indicated by the data from the computing device.

The computer-readable medium 600 may include a change detection module 630. The change detection module 630 may cause the processor 602 to detect a change in the power state of the computing device. In an example, the change detection module 630 may cause the processor 602 to receive an indication of the change in the power state of the computing device from the computing device. For example, the computing device may include a controller that continues to receive power even when the computing device is in a low power state or that indicates the change in power state immediately prior to finishing the change. The controller may detect when the computing device changes power states and transmit an indication of the change in the power state. Because the data provision module 620 is causing the processor 602 to provide data from the computing device, the change detection module 630 may cause the processor 602 to detect when the computing device is no longer generating data for the user. In an example, the change detection module 630 may cause the processor 602 to detect the change in the power state based on a responsiveness of the computing device.

The computer-readable medium 600 may include a power state alteration module 640. The power state alteration module 640 may cause the processor 602 to alter a local power state based on the detection of the change in the power state of the computing device. For example, the local device may be a display, and the power state alteration module 640 may cause the processor 602 to alter a power state of the display. In an example, once the computing device has finished transitioning to the low power state and is no longer providing data, the display may also be transitioned to a low power state in which it does not provide data to the user. In some examples, the power state alteration module 640 may cause the processor 602 to alter the local power state in response to or after the detection of the change in the power state of the computing device.

The computer-readable medium 600 may include a receipt notification module 650. The receipt notification module 650 may cause the processor 602 to notify a user of receipt of a user indication to change the power state. For example, the user may have provided an input to a local device that caused the indication module 610 to cause the processor 602 to indicate to the computing device to change the power state of the computing device. In some examples, the computing device may take time to change power states, and a local power state may not change until the power state of the computing device has changed. The receipt notification module 650 may cause the processor 602 to provide a notification to the user that makes clear the indication from the user to change the power state was received. The receipt notification module 650 may cause the processor 602 to cause a light to change illumination, to cause a message to be displayed, or the like. Referring to FIG. 2, when executed by the processor 602, the indication module 610, its constituents, the change detection module 630, or its constituents may realize the communication engine 220; the data provision module 620 or its constituents may realize the light 240 or the image display engine 235; the power state alteration engine 640 may realize the power engine 230; or the receipt notification engine 650 may realize the light 240 or the image display engine 235.

The above description is illustrative of various principles and implementations of the present disclosure. Numerous variations and modifications to the examples described herein are envisioned. Accordingly, the scope of the present application should be determined only by the following claims.

What is claimed is:

1. A display comprising:
   a user interface to receive an indication to change a power state;
   a communication engine to determine a power state of a computing device communicatively coupled to the communication engine; and
   a power engine to:
      based on the power state of the computing device being inconsistent with a power state of the display, determine whether to communicate the indication to change the power state to the computing device, and
      based on the indication to change the power state, alter a power state of the display,
   wherein the communication engine is to communicate the indication to change the power state to the computing device responsive to determining that the power state of the computing device is inconsistent with the power state of the display.

2. The display of claim 1, wherein the communication engine is to detect a change in the power state of the computing device based on the communication of the indication to change the power state, and wherein the power engine is to alter the power state of the display based on the detection of the change in the power state of the computing device.

3. The display of claim 1, wherein the communication engine is to determine the power state of the computing device prior to the user interface receiving the indication to change the power state.

4. The display of claim 1, wherein the communication engine is communicatively coupled to the computing device via a coupling to transfer power and data.

5. The display of claim 1, wherein the power engine is to change a power state of the display responsive to the communication engine determining a change in the power state of the computing device.

6. A method, comprising:
   determining a computing device is capable of changing a power state based on the computing device receiving an indication to do so;
   based on the determination, determining a power state of the computing device;
   determining whether to communicate an indication to change a power state to the computing device based on the power state of the computing device being inconsistent with a power state of a device coupled to the computing device; and
   communicating the indication to change the power state to the computing device responsive to determining that the power state of the computing device is inconsistent with the power state of the device.

7. The method of claim 6, further comprising determining the power state of the computing device has changed, and altering a local power state based on determining the power state of the computing device has changed.

8. The method of claim 6, wherein determining the computing device is capable of changing the power state comprises negotiating a communication mode that supports communicating indications to change power states.

9. The method of claim 8, wherein determining the computing device is capable of changing the power state comprises receiving a message in the communication mode, the message indicating that the computing device is capable of changing the power state.

10. The method of claim 6, wherein determining whether to communicate the indication to change the power state comprises determining whether the power state of the computing device matches a local power state.

11. A non-transitory computer-readable medium comprising instructions that, when executed by a processor of a local device, cause the processor to:
    determine a power state of a computing device;
    based on the power state of the computing device being inconsistent with a power state of the local device, determine whether to communicate an indication to change the power state of the computing device;
    indicate to the computing device to change the power state of the computing device responsive to determining that the power state of the computing device is inconsistent with the power state of the local device;
    receive data from the computing device after indicating to change the power state of the computing device;
    detect a change in the power state of the computing device; and
    alter a local power state based on the detection of the change in the power state of the computing device responsive to the indication to change the power state.

12. The computer-readable medium of claim 11, wherein the instructions cause the processor to provide the data from the computing device by the processor causing one selected from the group consisting of displaying image data and illuminating a light indicative of a status of the computing device.

13. The computer-readable medium of claim 11, wherein the instructions cause the processor to detect the change in the power state by receiving an indication of the change in the power state of the computing device from the computing device.

14. The computer-readable medium of claim 11, wherein the instructions cause the processor to notify a user of receipt of a user indication to change the power state.

* * * * *